US007980091B2

(12) United States Patent
Fotiadis et al.

(10) Patent No.: US 7,980,091 B2
(45) Date of Patent: Jul. 19, 2011

(54) REFRIGERATION DEVICE COMPRISING A CIRCULATING COOLING SYSTEM

(75) Inventors: Panagiotis Fotiadis, Giengen (DE); Alexander Görz, Aalen (DE); Hans Ihle, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 487 days.

(21) Appl. No.: 12/085,290

(22) PCT Filed: Oct. 16, 2006

(86) PCT No.: PCT/EP2006/067463

§ 371 (c)(1), (2), (4) Date: May 20, 2008

(87) PCT Pub. No.: WO2007/062905

PCT Pub. Date: Jun. 7, 2007

(65) Prior Publication Data

US 2009/0151387 A1 Jun. 18, 2009

(30) Foreign Application Priority Data

Nov. 30, 2005 (DE) ........................ 10 2005 057 155

(51) Int. Cl.
*F25D 17/04* (2006.01)

(52) U.S. Cl. ........................................... 62/408; 62/441

(58) Field of Classification Search .................... 62/441, 62/187, 419, 454, 455, 426, 208, 126
See application file for complete search history.

(56) References Cited

U.S. PATENT DOCUMENTS

| | | | | |
|---|---|---|---|---|
| 3,747,361 | A * | 7/1973 | Harbour | 62/157 |
| 3,759,053 | A * | 9/1973 | Swaneck, Jr. | 62/157 |
| 4,009,591 | A * | 3/1977 | Hester | 62/180 |
| 4,834,169 | A * | 5/1989 | Tershak et al. | 165/233 |
| 5,191,774 | A | 3/1993 | Park | |
| 5,201,888 | A * | 4/1993 | Beach et al. | 62/187 |
| 5,231,847 | A * | 8/1993 | Cur et al. | 62/187 |
| 5,375,428 | A * | 12/1994 | LeClear et al. | 62/187 |
| 5,904,049 | A * | 5/1999 | Jaster et al. | 62/204 |

FOREIGN PATENT DOCUMENTS

| | | |
|---|---|---|
| EP | 1 517 103 | 3/2005 |
| JP | 2-118384 | 5/1990 |
| JP | 5-196340 | 8/1993 |
| SU | 1532492 A1 | 12/1989 |

OTHER PUBLICATIONS

International Search Report PCT/EP2006/067463.

* cited by examiner

*Primary Examiner* — Mohammad Ali
(74) *Attorney, Agent, or Firm* — James E. Howard; Andre Pallapies

(57) ABSTRACT

A refrigeration device comprising two refrigerated regions, whose temperature is independently regulated and which are supplied with cold air from a common evaporator chamber. A flap is situated in one branch of a cold air conduit, which connects the refrigerated regions to the evaporator chamber, said flap being pivotable between two positions, each of which seals a respective branch of the conduit. The pivoting displacement of the flap is driven by an eccentric cam.

5 Claims, 4 Drawing Sheets

27 19 34 30 33 35 36 29 29 28

12
2
17
16
15
18
8
7
13
19
20
21
10
3
9
6
22
V
V
4
5

Fig. 3
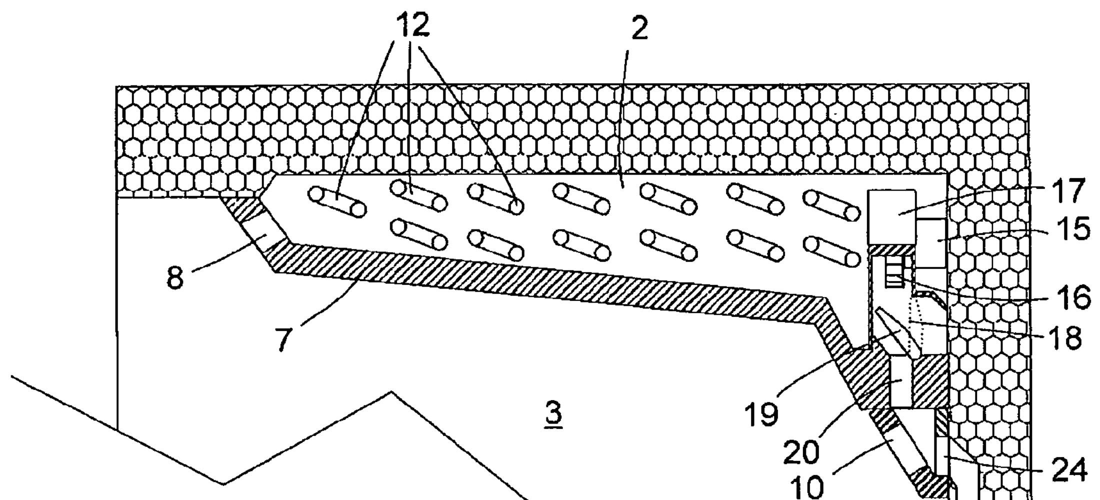
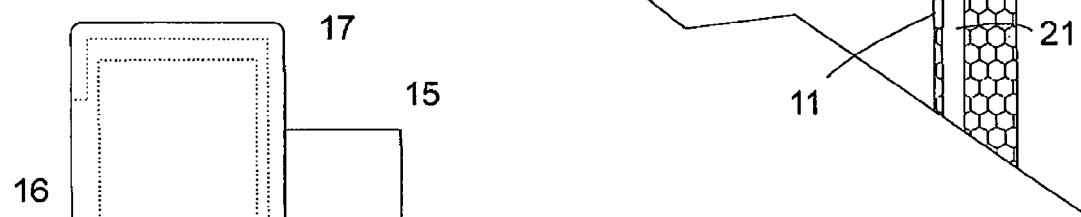
Fig. 4
Fig. 5
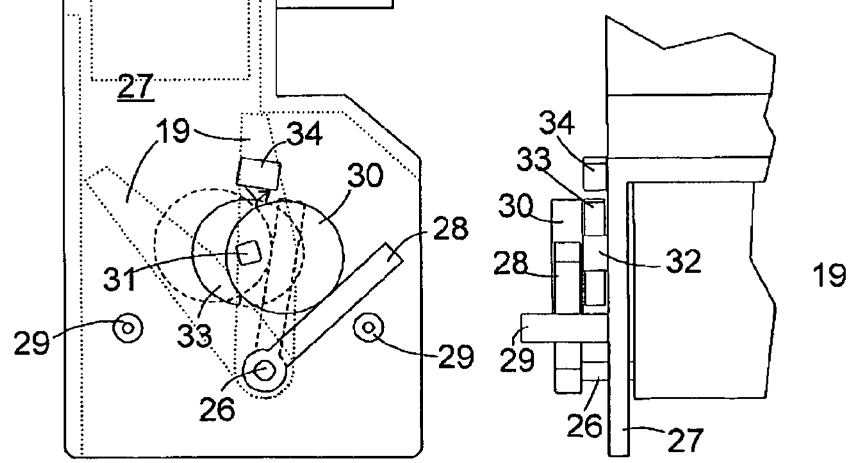

REFRIGERATION DEVICE COMPRISING A CIRCULATING COOLING SYSTEM

BACKGROUND OF THE INVENTION

The present invention relates to a refrigeration appliance with a circulated-air cooling system, in other words a refrigeration appliance, in whose housing an evaporator region and at least one refrigerated region for holding chilled goods are separated off from one another and the refrigerated region is cooled by cold air supplied from the evaporator region. In particular the invention relates to a refrigeration appliance with a circulated-air cooling system, having at least two refrigerated regions, whose temperatures are regulated independently of each other by the supply of cold air from a common evaporator chamber.

An unpublished German patent application by the applicant discloses such a refrigeration appliance, in which a flap is arranged in a branch of a cold air conduit, which connects the refrigerated regions to the evaporator chamber, said flap being pivotable between two positions respectively blocking a branch of the conduit, to supply one of the two refrigerated regions respectively with cold air in a selective manner.

BRIEF SUMMARY OF THE INVENTION

The object of the invention is to specify a refrigeration appliance of the type mentioned above with a simple and robust positioning mechanism to drive the pivoting movement of the flap.

The object is achieved in that the pivoting movements of the flap are driven by way of an eccentric.

According to a first embodiment of the invention the flap is coupled to a lever arm, which scans a circumferential surface of the disk-shaped eccentric. With this embodiment the eccentric can only exert a drive force on the lever arm in one direction, so that a reset movement of the lever arm has to be driven by another force, in particular a weight or spring force.

According to a second embodiment the flap is coupled to a lever arm, which is guided in a slot in the eccentric. In this instance the eccentric can exert torque forces on the lever arm in opposing directions.

In order to be able to capture the current position of the flap, a disk is preferably coupled rigidly to the eccentric, its circumference forming at least part of a circle concentric with the axis of the eccentric and the disk is assigned a sensor to capture its rotational position.

Features of the disk that can be captured by the sensor are preferably located in a capture region of the sensor when the valve is in one of the branch-blocking positions. If the eccentric is stopped precisely when the sensor captures one of these features, it is ensured that the flap is in one of the representations.

The features of a disk to be captured are preferably arranged at an angular distance of 180°.

BRIEF DESCRIPTION OF THE DRAWINGS

Further features and advantages of the invention will emerge from the description which follows of exemplary embodiments, in which:

FIG. 3 shows a section through the upper region of the body in a plane displaced to the side in relation to the center plane, along the line III in FIG. 1;

FIG. 4 shows a detailed side view of a fan housing in the refrigeration appliance according to a first embodiment;

FIG. 5 shows a fragmented rear view of the fan housing in FIG. 4; and

DETAILED DESCRIPTION OF THE PRESENT INVENTION

Figure 1:
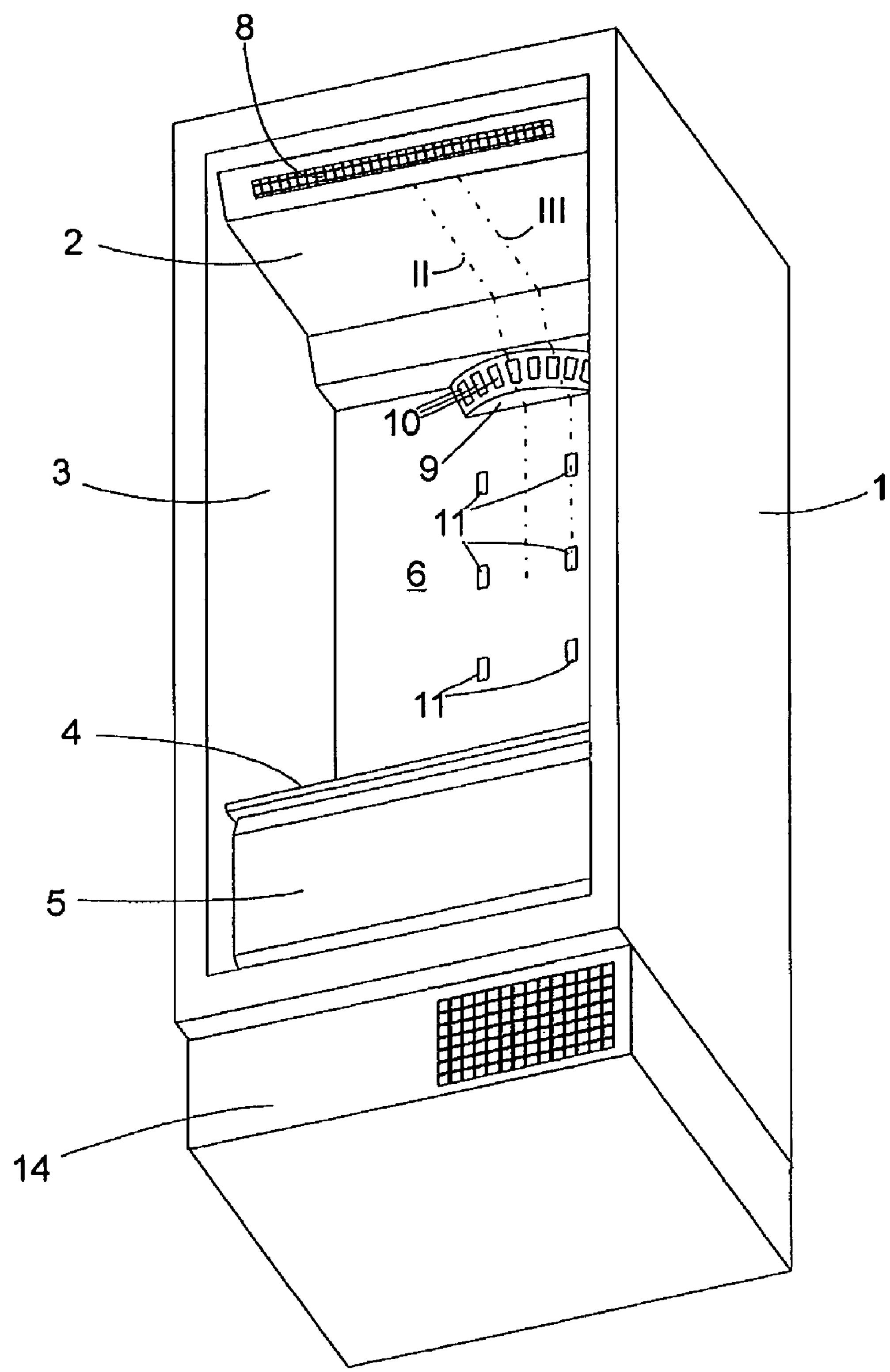
FIG. 1 shows a perspective view obliquely from below of the body of an inventive refrigeration appliance.

FIG. 1 shows a perspective view of a body 1 of an inventive refrigeration appliance. The appliance has a door, which is omitted in the figure. The interior of the body 1 is divided into an evaporator region 2 at the top below the cover of the body 1, a first refrigerated region 3 and, separated from this by an insulating intermediate wall 4, a second refrigerated region 5. A pull-out box is housed in the second refrigerated region 5. The first refrigerated region 3 is normally divided into compartments one on top of the other by a number of supports for chilled goods but these compartments are omitted in the figure, to show as much of the rear wall 6 of the body 1 as possible.

An air inlet opening 8 is formed on the front face of an intermediate wall 7 (see FIG. 2) separating the evaporator region 2 from the first refrigerated region 3, it being possible for air from the first refrigerated region 3 to enter the evaporator region 2 through said air inlet opening 8. Conduits through which air from the second refrigerated region 5 can flow to the evaporator region 2—not shown in the figure—run in side walls of the body 1; another option is an air conduit in the interior of the door, starting at the level of the second refrigerated region 5 and ending facing the air inlet opening 8.

A distributor hood 9 is attached to the intermediate wall 7 adjacent to the rear wall 6, on which distributor hood 9 a plurality of air holes 10 is formed, through which cold air moving out of the evaporator region 2 is distributed in various directions in the upper part of the first refrigerated region 3. A number of pairs of openings 11, from which cold air can likewise flow, are located on the rear wall 6 below the distributor hood 9. The level of these pairs of openings 11 is selected so that if chilled goods supports are mounted in the first refrigerated region 3, each pair of openings 11 supplies one compartment.

Figure 2:
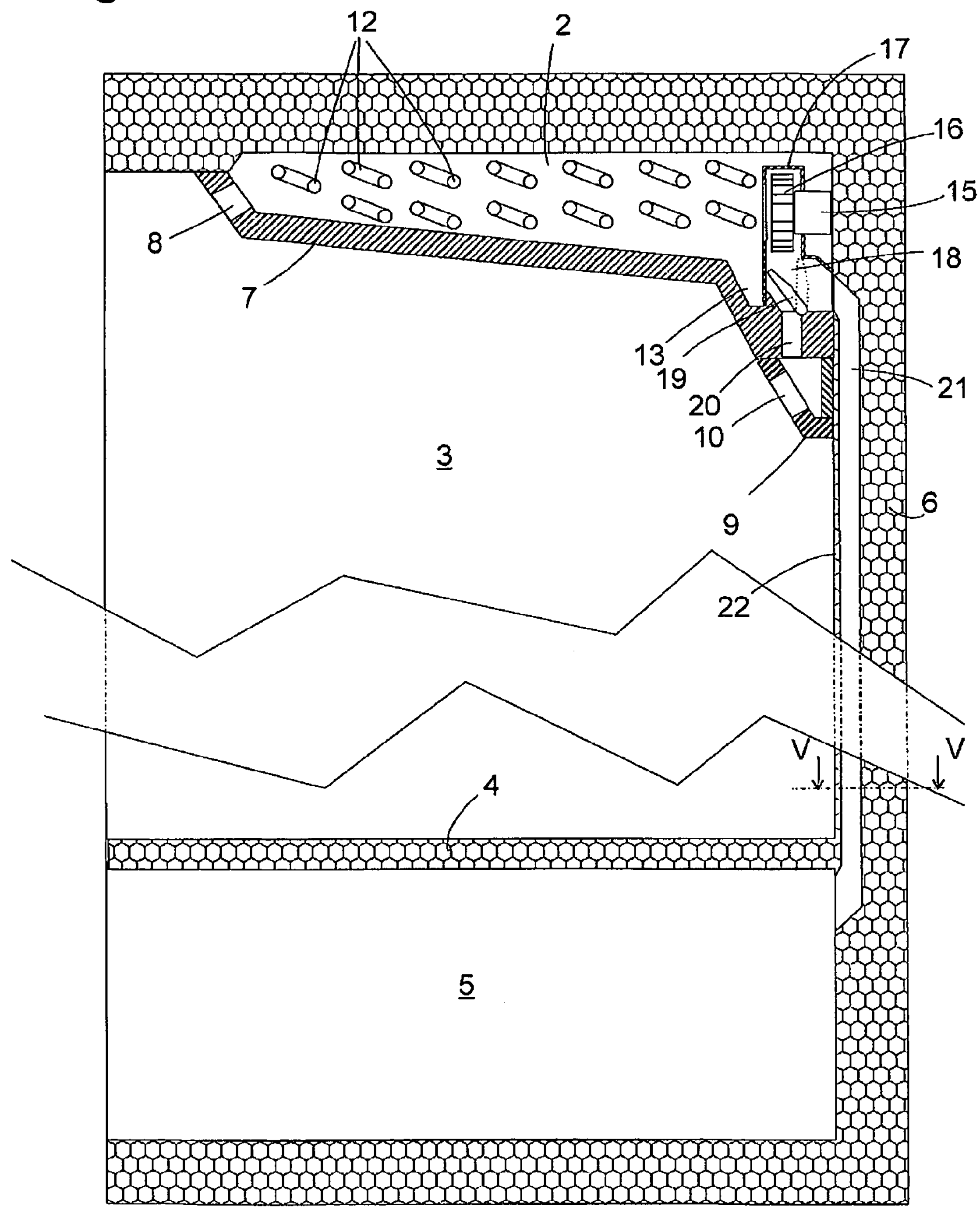
FIG. 2 shows a section through a center plane of the body running vertically and in the direction of the depth, along the line II in FIG. 1.

FIG. 2 shows a section of the refrigeration device from FIG. 1 along a center plane extending vertically and in the direction of the depth of the body 1, represented in FIG. 1 by a dot-dash line II. Cooling coils of an evaporator 12 are shown in the interior of the evaporator region 2 in the section, with air penetrating through the air inlet opening 8 flowing onto them. Toward the rear wall 6 of the body the intermediate wall 7 slopes into a groove 13, which collects condensation dripping off the evaporator 12. The condensation is conveyed to an evaporator unit housed in the base region 14 (see FIG. 1) of the body 1 by way of a pipe conduit (not shown).

A fan is housed behind the groove 13, adjacent to the rear wall 6, having a motor 15, a bucket wheel 16 driven by said motor 15 and a housing 17. An intake opening is formed on the front face of the housing 17, in the axial direction of the bucket wheel. The upper half of the housing 17 runs closely around the bucket wheel 16 in the circumferential direction, the housing 17 being open below, so that rotation of the bucket wheel 16 causes air that is accelerated radially outward to flow into a chamber 18, filling the lower half of the housing 17.

A pivotable flap 19 is housed in this chamber 18. In the position shown in the figure the flap 19 blocks a cold air supply opening 20, which leads vertically downward to the first refrigerated region 3. The air is thus pushed toward the rear wall 6 and into a cold air supply path 21, which is separated from the first refrigerated region 3 by a thin insulating layer 22 and leads to the second refrigerated region 5 in the interior of the rear wall. When the flap 19, which is pivoted on an intermediate wall 23 between the cold air supply opening 20 and the cold air supply conduit 21, is moved into a vertical position shown in the figure as a dotted outline, it blocks the cold air supply conduit 21 and the cold air flow reaches the distributor hood 9 through the cold air supply opening 20. The figure shows one of the air holes 10, through which the air flows out of the distributor hood 9 into the first refrigerated region 3.

FIG. 3 shows a section through the upper part of the body 1 along the plane marked III in FIG. 1. This figure shows the housing 17 extending in an arc round the bucket wheel 16 more clearly. It can also be seen that the face of the distributor hood 9 facing the rear wall 6 has an opening 24, which is aligned with an opening in the rear wall 6, which leads to a distributor path 25 extending vertically in the rear wall 6. One of the number of further openings 11 leading from the distributor path 25 into the first refrigerated region 3 can likewise be seen.

When the cold air supply opening 20 is open, the deflection of air flowing vertically downward through these to an obliquely downward and forward direction past the air holes 10 of the hood 9 results in a dynamic pressure in the interior of the hood 9, which forces some of the air into the distributor path 25. This quantity of air can be determined by corresponding determination of the cross sections of the air holes 10, the openings 11, 24 and the distributor path 25.

In one simplified embodiment the distributor hood 9 and the distributor path 25 fed by way of it with the openings 11 could be omitted, so that cold air can flow through the opening 20 directly into the first refrigerated region 3. In this instance compartment bases (not shown) arranged in the first refrigerated region expediently do not extend directly to the rear wall 6, so that cold air forced through the opening 20 can also reach deeper regions of the first refrigerated region 3.

FIG. 4 shows a side view of the fan housing 17. Parts located in the interior of the housing, such as the flap 19 and the bucket wheel 16, are shown as dotted outlines. The flap 19 is shown twice, in its positions blocking the cold air supply conduit 21 and cold air supply opening 20 respectively.

The flap 19 is mounted in a manner such that it cannot be rotated on a shaft 26, which is supported in holes in the side wall 27 shown in a top view and an opposite side wall and from which a segment projects beyond the side wall 27, supporting a lever arm 28.

Two pins 29 projecting from the side wall 27 serve to support a motor (not shown), which drives an eccentric 30 in the form of a circular disk in a rotational manner by way of a step-down transmission, in that a drive shaft of the step-down transmission engages in a square recess 31 in the eccentric 30. An axial pin 32 standing out from the eccentric 30 as an extension of the recess 30 is shown in the partial rear view of the housing 17 in FIG. 5 and is supported in a rotatable manner in a recess in the side wall 27. A semicircular disk 33 is connected rigidly to the axial pin 32; its circumferential arc is concentric with the rotational axis of the eccentric 30.

A spring (not shown) pushes the lever arm 29 counter-clockwise against the circumferential surface of the eccentric 30. In the position of the eccentric 30 shown with unbroken lines in FIG. 4 the flap 19 is in an essentially vertical position, in which it blocks the passage to the cold air supply conduit 21. The eccentric 30 converts a rotation of the motor in the same rotational direction to a swinging movement of the flap 19. Rotation of the eccentric 30 through 180° moves it into the position shown as a dashed outline in FIG. 4; in this position the flap 19 blocks the cold air supply opening 20.

The transmission ratio from motor to lever arm is variable as a function of the position of the lever arm 28. At the point of reversal of the movement of the flap in each instance, in other words in the two extreme positions shown in FIG. 4, the transmission ratio becomes 0, in other words the torque available to pivot the flap diverges. Therefore even a low-power motor is sufficient to release the flap 19 from these extreme positions, even if it should be frozen firmly in said position.

A reflecting light barrier 34 is mounted above the semicircular disk 33 on the side wall 27 and serves as a sensor to capture the rotational position of the eccentric 30. When the circumferential arc of the disk 33 is in front of the light barrier 34, a light beam emitted therefrom is reflected off the circumferential arc and travels to a photocell of the light barrier 34. However as soon as the edge of the circumferential arc is reached, reflection ceases. A control circuit (not shown) is therefore able to identify from the abrupt drop in the light intensity registered by the light barrier 34 that the flap 19 has reached one of its two extreme positions and to stop the motor driving it in this position. The one of the two extreme positions characterized by a drop in light intensity is a function of the—arbitrarily determinable—rotational direction of the eccentric 30. The respective other extreme position is characterized by an increase in the light intensity registered by the light barrier 34.

Other types of sensors can also be provided instead of the light barrier 34 to capture the position of the disk, e.g. a Hall sensor or a mechanical contact.

Figure 6:
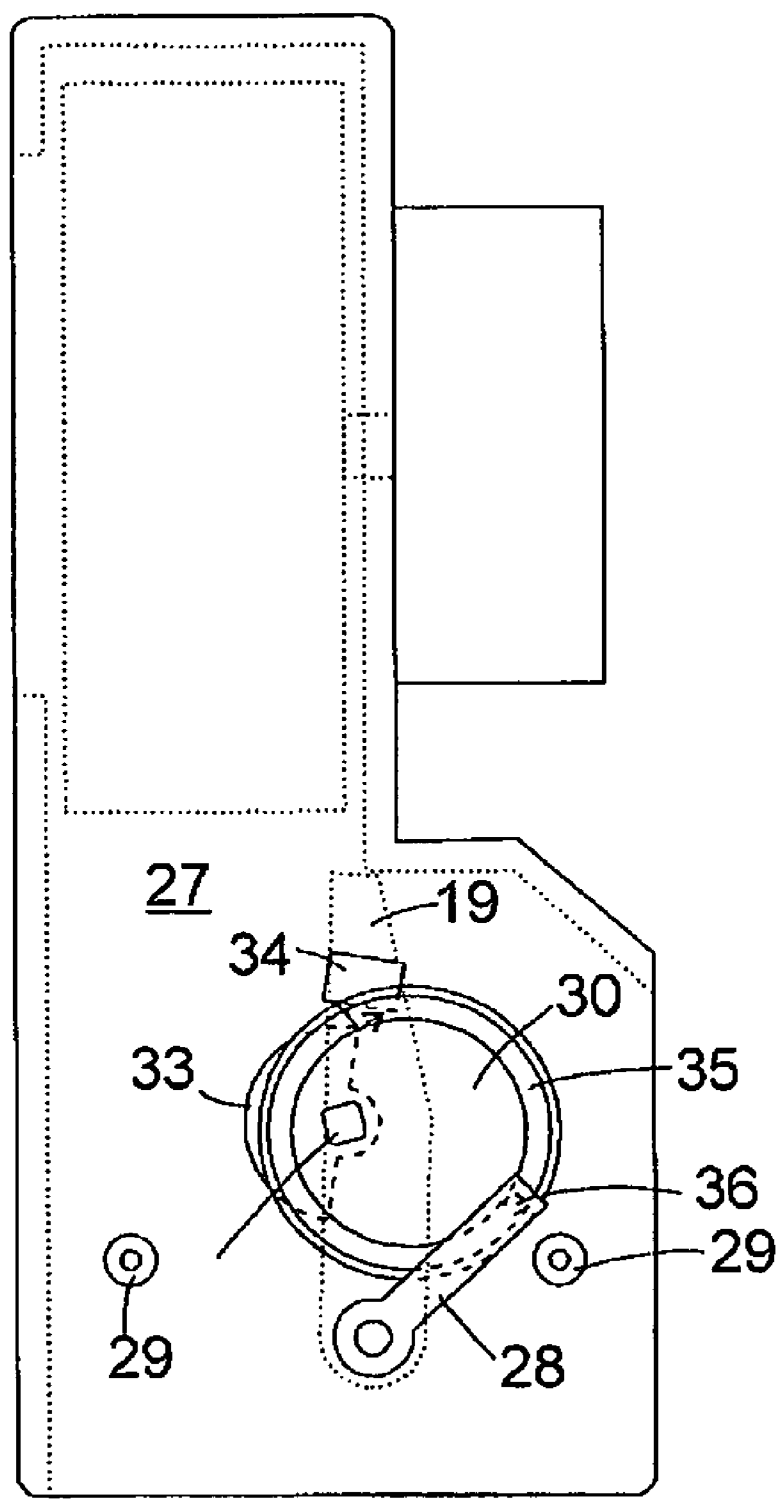
FIG. 6 shows a similar view of a fan housing to FIG. 4 according to a second embodiment of the invention.

FIG. 6 shows a side view of the housing 17 similar to the one in FIG. 4 according to a second embodiment of the invention. For the sake of clarity only one rotational position of the eccentric 30 is shown in FIG. 6. Elements of this embodiment with identical functions to elements already described with reference to FIG. 4 or 5 are assigned the same reference characters in FIG. 6 and are not explained in detail again. The essential difference from the embodiment in FIG. 4 is that the eccentric 30 is provided with a circumferential slot 35, in which a pin 36 on the lever arm 28 engages. Here too the rotation of the eccentric 30 about the axis defined by the recess 31 drives an oscillating pivoting movement of the lever arm 28, with the eccentric 30 nevertheless being able to exert a torque both clockwise and counter-clockwise on the lever arm 28, depending on the side wall of the slot 35 on which the pin 36 rests.

The invention claimed is:

1. A refrigeration appliance with two refrigerated regions having an arrangement for independently regulating a temperature within each region, an evaporator chamber for supplying cold air to both regions through a cold air conduit operatively connected to the evaporator chamber and both regions, and a flap arranged in a branch of the cold air conduit, said flap being pivotable between two positions wherein each position respectively blocks a branch of the conduit, the refrigeration appliance comprising an eccentric apparatus for driving movement of the flap, wherein the eccentric apparatus includes a disk-shaped member and the refrigeration appliance further comprises a lever arm coupled to the flap, wherein the lever arm scans a circumferential surface of the disk-shaped member.

2. A refrigeration appliance with two refrigerated regions having an arrangement for independently regulating a temperature within each region, an evaporator chamber for supplying cold air to both regions through a cold air conduit operatively connected to the evaporator chamber and both regions, and a flap arranged in a branch of the cold air conduit, said flap being pivotable between two positions wherein each position respectively blocks a branch of the conduit, the refrigeration appliance comprising an eccentric apparatus for driving movement of the flap, wherein the eccentric apparatus includes a slot formed therein and the refrigeration apparatus further comprises a lever arm coupled to the flap, wherein the lever arm is operatively associated with the slot in the eccentric apparatus and is guided thereby.

3. A refrigeration appliance with two refrigerated regions having an arrangement for independently regulating a temperature within each region, an evaporator chamber for supplying cold air to both regions through a cold air conduit operatively connected to the evaporator chamber and both regions, and a flap arranged in a branch of the cold air conduit, said flap being pivotable between two positions wherein each position respectively blocks a branch of the conduit, the refrigeration appliance comprising an eccentric apparatus for driving movement of the flap; and a disk rigidly coupled to the eccentric apparatus, wherein the circumference of the disk forms at least part of a circle concentric with an axis of rotation of the eccentric apparatus; and a sensor operatively associated with the disk to sense a rotational position of the disk.

4. The refrigeration appliance according to claim 3 wherein the disk is formed with surface elements that can be captured by the sensor located in a capture region of the sensor when the flap is in one of the branch-blocking positions.

5. The refrigeration appliance according to claim 4 wherein the surface elements on the disk are separated by an angular distance of 180°.

* * * * *